Figure 1:
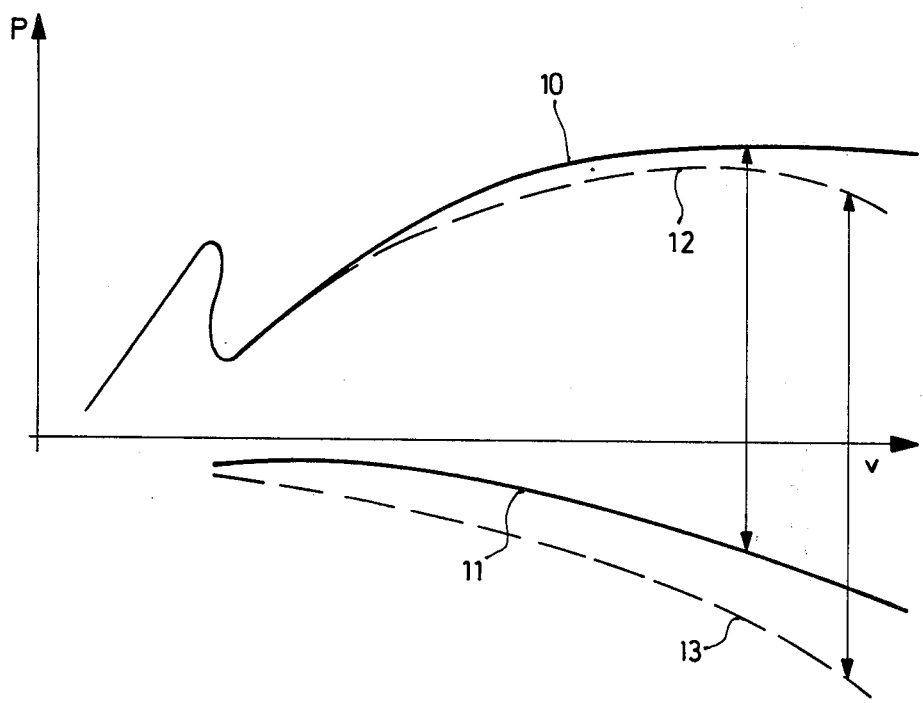

United States Patent [19]

Dinkelacker et al.

[11] 4,055,996
[45] Nov. 1, 1977

[54] AUTOMOTIVE VEHICLE PERFORMANCE TEST STAND SYSTEM AND PERFORMANCE MEASURING METHOD

[75] Inventors: Walter Dinkelacker, Stuttgart; Rudolf Blum, Wendlingen; Klaus Abele, Uhingen; Jürgen Knödler, Remshalden-Grunbach; Peter Ebinger, Owen (Teck), all of Germany

[73] Assignee: Robert Bosch GmbH, Stuttgart, Germany

[21] Appl. No.: 722,775

[22] Filed: Sept. 13, 1976

[30] Foreign Application Priority Data

Sept. 11, 1975 Germany ............................. 2540514
Apr. 8, 1976 Germany ............................. 2615193

[51] Int. Cl.² ................................................. G01L 5/13
[52] U.S. Cl. ....................................................... 73/117
[58] Field of Search ........................... 73/117, 116, 126

[56] References Cited

U.S. PATENT DOCUMENTS 3,690,165 9/1972 Sturmo et al. ........................ 73/117
3,921,446 11/1975 Lundloff ............................. 73/117 X
3,926,043 12/1975 Marshall et al. ..................... 73/117
3,930,409 1/1976 Ostrander et al. .................... 73/117

Primary Examiner—Jerry W. Myracle
Attorney, Agent, or Firm—Flynn & Frishauf

[57] ABSTRACT

To provide for accurate testing of the performance of automotive vehicles on test stands in which the wheels of the vehicle are in engagement with inertia rollers, the inertia rollers being accelerated through the vehicle wheels by the vehicle engine, and the torque measured, and then decelerated by disconnecting of engine driving power and coasting torque measured, operating parameters related to speed and rate of change of speed are sensed and a speed signal is provided, tractive effort is sensed and a traction signal provided, and the signals are combined to provide an output representative of engine performance, the combined signals being further modified by the output of a correction stage which introduces correction signals such as pressure, ambient temperature, presence or absence of automatic transmission, or the like; the apparatus further comprises selectable switches, for example a speed selector switch, so that measurements can be taken with respect to predetermined design speeds to test performance of the vehicle, or an engine, with respect to such a predetermined speed.

22 Claims, 2 Drawing Figures

AUTOMOTIVE VEHICLE PERFORMANCE TEST STAND SYSTEM AND PERFORMANCE MEASURING METHOD

The present invention relates to a test stand system, and to a method of testing the performance of automotive vehicles and the engines thereof, by supporting at least one of the wheels of the vehicle in contact with a roller which is connectable to an inertia mass. The inertia mass can be accelerated by transfer of power from the engine of the vehicle; thereafter, and upon disconnection of engine power, the inertia mass will decelerate. By measuring numbers of revolution or equivalent parameters such as speed, angular speed, or the like, and the rate of change of the parameters — with respect to time — the power or tractive effort available at the wheels can be determined by evaluating acceleration; the losses in the drive train of the vehicle can also be determined by evaluating deceleration; by summing the evaluated results, the power of the engine can be obtained. The foregoing, of course, assumes the additional losses and inertia effects of the test stand itself can be compensated or considered when obtaining the output values.

Automotive vehicles test stands, and particularly test stands for vehicles with internal combustion (IC) engines, usually have a set of rollers arranged for engagement with the wheels to which a torque measuring or power brake is connectable. Such a brake may, for example, be a hydraulic turbulence brake, an electrical eddy current brake, or a similar system. At a predetermined speed of the engine, tractive effort, which is the inverse of braking power, can be measured by sensing the power transferred to the roller in contact with the wheels. The engine, usually, is engaged in third or fourth gear of the vehicle. It is known that measuring the tractive effort at the wheels of the vehicle does not permit unambiguous determination of engine power or energy output. Test instructions therefore usually provide that numerous parameters must be exactly maintained in order to permit a judgement of engine output power to be made when measuring torque or tractive effort at the wheels. Such parameters which must be accurately considered are, for example, tire pressure, temperature in the transmission, temperature in the differential, and the like. Steady-state conditions of the various parameters obtain usually only after the vehicle has been on a test stand for an appreciable period of time. Some parameters which influence the output frequently cannot be considered at all, such as type of tire in engagement with the test rolls, the condition of wear of the tire, and other factors affecting the condition of elements of the vehicle itself, as well as of the test stand. Losses are, at least in part, dependent on speed and the relationship between engine output and wheel output is not constant, nor linear. Known measuring systems and methods utilize apparatus in which the power from the motor is transferred to a torque brake so that the energy dissipated in the brake should be equal to the energy generated by the motor, less losses in the system between the motor and the brake. As a rule, measurement is effected by measuring torque or moment at the power brake; by multiplying the wheel speed, tractive effort can then be calculated.

Practical experiments with the systems and method as described have shown that the tractive effort at the wheel is not sufficiently determinative to evaluate the condition of the engine of the vehicle or its performance.

It has previously been proposed to determine energy dissipated in losses besides the power or tractive effort available at the wheel. Such a determination of losses assumes that the vehicle and the test stand can be driven from an external power source. The brake is disconnected, but losses become fully effective. If the respective torque is measured, the energy due to losses can be determined and combined with the tractive effort at the wheel so that, theoretically, the total power output or energy output of the engine can be determined. In one embodiment of the apparatus, the vehicle wheels are driven from the test stand. This can be effected, for example, by an additional electric motor. In another construction, the torque brake is constructed in form of a dynamo electric machine which, when operating as a brake, forms a d-c generator but which can also be operated as a motor. To measure wheel tractive effort, the dynamo electric machine generates current which is measured; the current is dissipated by means of resistors. The losses are determined by driving the dynamo electric machine as a motor. In another embodiment, current generated by the dynamo electric machine is stored in batteries which then feed the current back to drive the motor upon measuring of losses. This method has the advantage that supply power requirements for the electric motor can be avoided. The power dissipated in powerful vehicles may be up to 40 kW.

Another type of test stand which as been proposed tests for wheel tractive effort as well as losses by using an inertia mass. In the drive or traction phase of the test, power is stored in a rotating inertia mass; tractive effort is measured at that time. The actual parameter measured will be acceleration power. The energy stored in the rotating inertia mass is then used in order to measure the losses, that is, the energy to overcome losses when the engine is disconnected, that is, when drive is effected from the inertia mass to the wheels of the vehicle.

The test stands and testing methods heretofore known still have some disadvantages. The cost to provide brakes and motors, dynamo electric machines, and the like, and possibly additional batteries, is high. In the last-described embodiment, measurement of power is not effected stationarily, but rather during the accelerating phase. This permits a relatively short time period to make the measurements; however, moving masses in the vehicle introduce errors and distort the measurement results. In all cases, additional losses and parameters remain which are not considered by the measuring systems or methods and which further detract from accuracy of measured results.

It is an object of the present invention to provide a system and a method for dynamic testing of automotive vehicles and of their engines which provides test results which are more accurate, which do not have the disadvantage of the prior art, and which permit highly accurate determination of the power output of the engine in the vehicle. Additionally, the system and method should be so arranged that it can be programmed to proceed, in steps, practically automatically so that personnel in garages need not be specially or highly trained for use of the apparatus or to carry out the method. The arrangement should be capable of being constructed in a simple and sturdy manner to be suitable for installation in the generally rough environment of automotive repair stations and garages, while simultaneously providing assurance against erroneous operation.

Subject matter of the present invention: Briefly, an arrangement is provided to sense wheel speed, connected to a differentiator to which a multiplication stage is connected to form the product of a signal which is a function of speed, and a signal which is a function of torque; further, correction signal generating means are provided which output signal is likewise applied to the multiplication stage to introduce correction parameters thereto, for example parameters relating to temperature, pressures, presence or absence of an automatic transmission, or the like.

When determining the tractive effort available at the wheel, as well as when determining the losses, a correction value is being considered which depends on losses in the drive train, that is, losses which affect tractive effort, which, preferably, additionally considers losses due to speed or change in speed, as well as constant losses. These losses may arise in the vehicle or in the test stand itself. The losses in the test stand may not be the same if vehicles of different sizes or makes are being tested. Losses which depend on speed or which are constants are effective with respect to the overall correction values only with respect to the locus of their generation; they decrease power output and also decrease the consequential losses.

The inertia mass is driven over the rollers of the test stands by the wheels of the vehicle during the run-out phase, that is, upon deceleration of the wheels. In accordance with a preferred embodiment of the invention, the correction values to be added upon acceleration and upon deceleration of the vehicle wheels, or of the inertia mass, respectively, are selected to be different since the overall connected mass to the wheels differs. During run-out, the internal combustion engine and the transmission are not included in the drive train, so that the losses within the transmission itself should also not be considered.

Figure 2:
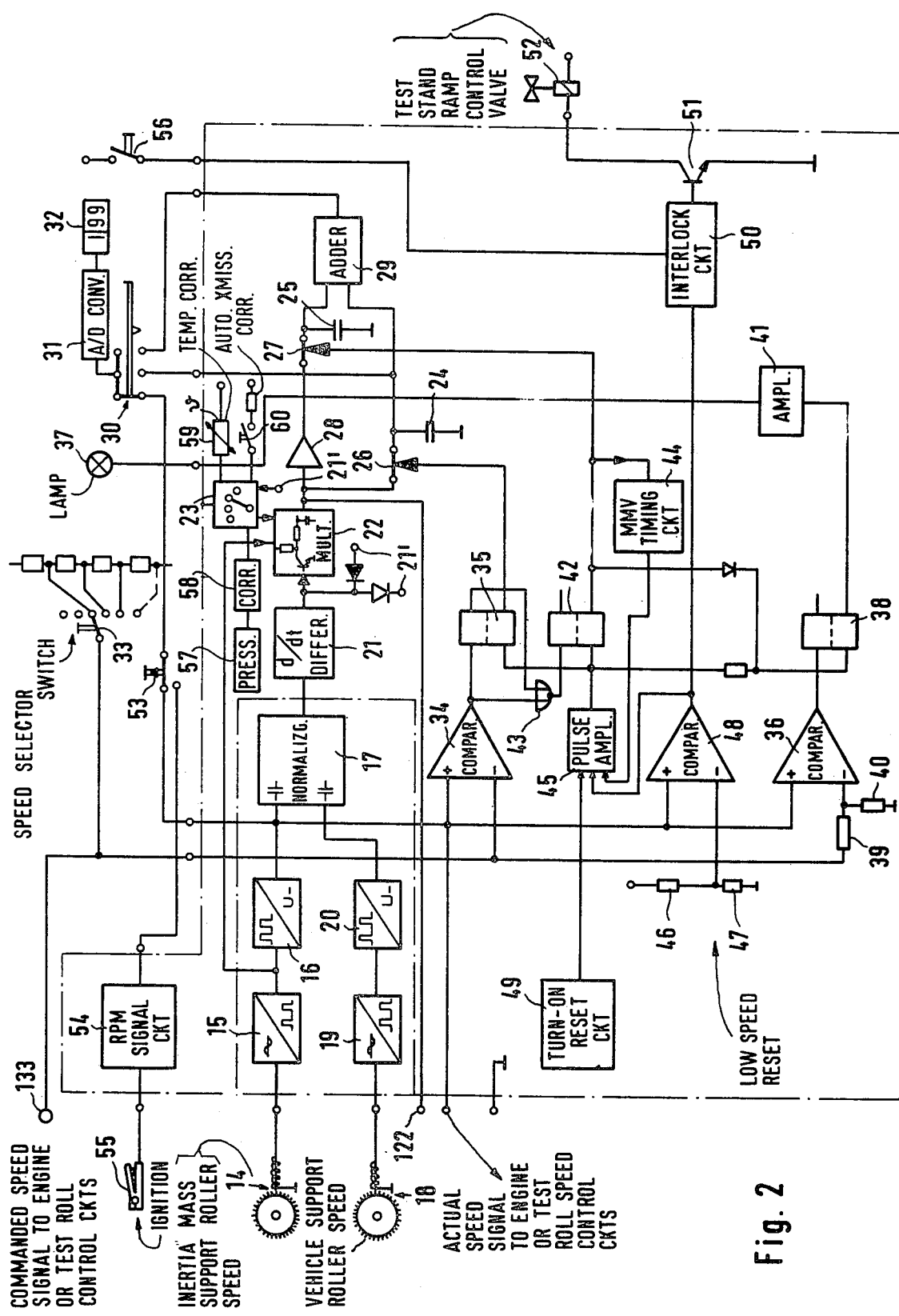

The invention will be described by way of example with reference to the accompanying drawings, wherein:

FIG. 1 is a graph of tractive effort and power losses (ordinate) with respect to speed (abscissa); and FIG. 2 is a highly schematic combined circuit and block diagram of a system to determine engine power and vehicle tractive effort.

The invention will be described in connection with an automotive vehicle test stand for automotive vehicles having an internal combustion engine, operating dynamically. Engine performance, and specifically engine power, is to be determined or tested by means of an inertia test stand and applying the laws of dynamics. Inertia test stands have the characteristics that a single inertia mass is present; there is no torque brake. Power transmitted from the vehicle wheels to the test stand is, essentially, stored temporarily, to be released or supplied during the testing steps. The combined system of vehicle-and-test-stand receives energy derived from the fuel supplied to the IC engine of the vehicle. The energy from the IC engine is equal to the change, with respect to time, of the kinetic energy of the vehicle-and-test-stand combination less the losses which arise during the transfer, which are changed to heat. If the energy supplied by the IC engine is equal to zero — which can be obtained by declutching the engine from the system, or otherwise disconnecting the drive train from the engine, then the change, with respect to time, of the kinetic energy of the system of vehicle-and-test-stand is equal to the losses and, if the test stand losses are known, the losses in the vehicle due to movement thereof can be determined. The losses, thus, can then be mathematically calculated.

Measuring power is effected by carrying out a dynamic test sequence. First, the engine is accelerated under full throttle to a predetermined nominal speed; thereafter, and upon declutching or operating the vehicle in "neutral", the vehicle wheels decelerate to a stop by being driven from the inertia mass of the test stand. The sum of the acceleration power and the deceleration power is total motor output.

Losses upon storage of energy in the inertia mass must be considered in order to render the overall test results in the system and method above described, more accurate. These losses which arise upon storage of energy in the inertia mass must be analyzed for their various components. Specifically, the losses are a composite of constant losses; losses dependent on speed; and losses depending on tractive effort or power. Constant losses, for example, are frictional losses in bearings. Losses which depend on tractive effort are related to the efficiency of power transfer between the engine and the test stand roller; this efficiency is always less than 100%. These losses which arise are due to the transmission efficiencies — less than 100% — of gearings in the transmission and in the differential, as well as the efficiency of power transfer from tire to surface, in the case of a test stand, to the test stand roller. Speed-dependent losses arise due to windage losses of wheels and rollers, turbidity losses in the transmission and the differential, as well as other losses due to viscosity of lubricant grease and oil in the bearings and the like. These various losses, so analyzed, must be considered when measuring the power output in order to obtain an accurate measuring result.

The constant losses should be equal during both phases of the test, that is, during the acceleration and the deceleration phase. Speed losses should also, preferably, be at least equal in both phases, so that these losses compensate during these phases. The tractive effort losses, however, are losses which are different in the two phases of the test and, in both cases, are negative and therefore reduce the measured power.

The losses as described are considered by correction of the basic moment of inertia of the inertia mass. Decrease of the power transferred as a result of tractive effort, that is, decrease proportionate to power output may, therefore, be considered as a multiplicative factor, or as a proportionality factor in the equivalent weight of the inertia mass, corresponding to the mass of the vehicle to be moved.

The transfer of power is affected differently by the losses at different points or elements of the vehicle. Elements in the chain of power transmission which are sequentially positioned in the chain from the IC engine to the inertia mass are differently affected when connected in the reverse order, that is, when power flow is from the inertia mass towards the elements closest to the engine. The elements at any one point are, therefore, affected by a lesser power transfer upon change in direction of power flow and the resulting losses, downstream with respect to power flow, of the elements are, looked at from an absolute point of view, less than those of preceding elements in the direction of power flow. These differential aspects of losses must likewise be considered for accurate determination in a power test.

The correction values, preferably, should be so set that they will depend on the type and make of the vehicle to be tested. Further, and to increase the accuracy of correction effected by the correction value introduced, the nominal power output of the IC engine can also be considered.

Referring now to FIG. 1, in which solid curve 10 shows power with respect to speed in fourth gear upon acceleration of the inertia mass. Solid curve 11 shows the relationship of power and speed when the IC engine is disconnected, for example by being declutched, from the wheels of the vehicle and the wheels are driven by the inertia mass. The sum of the area included between curves 10 and 11 then is a measure of the power of the IC engine. Curves 10 and 11 are drawn for an example in which normal losses are encountered; the curves 12 and 13, shown in broken lines, are drawn to relate to another vehicle with another engine having, for example, higher and possibly excessive losses.

FIG. 2 shows a diagram, in highly schematic form, of a system with which power can be determined simply and effectively. It is intended to be used with a roller-test stand — not shown — on which a support roller is provided engaged by one or both of the driven wheels of a vehicle to be tested. An electromagnetic speed transducer 14 is provided which furnishes an output signal representative of speed of the test stand roller. Transducer 14 is connected to a wave-shaping circuit 15 and to an averaging circuit 16. The output of the averaging circuit is connected to a weighting stage 17. An idler roller of the test stand — not shown — has an electromechanical transducer 18 associated therewith which provides an output signal representative of speed of the idler roller to a waveshaping circuit 19 to which an averaging circuit 20 is connected, the averaging circuit 20 being likewise connected to the weighting or normalizing stage 17. The normalizing or weighting stage 17 effects combination of the two speed signals and eliminates measuring errors which arise upon measuring of speed if, for example, the wheels which run on the rollers of the test stand are subject to oscillation in the direction of the major longitudinal axis of the vehicle. The output signal of the normalizing stage 17 is connected to a differentiator 21 which generates an acceleration signal. The differentiator 21 is connected to one multiplication input of a multiplier 22 in which the signal representative of acceleration, which likewise is representative of the tractive effort on the rollers, is multiplied with a speed signal, for example derived from the output between wave-shaper 15 and averaging circuit 16. The product corresponds to tractive effort of the vehicle.

Correction values to be considered when determining power output or available energy are introduced to the multiplier 22 from a correction circuit 23, which introduces correction factors for the multiplication carried out in multiplier 22. In the most simple form, the correction unit 23 can be a potentiometer, the output voltage of which is adjusted, and operating as a voltage divider. In order to obtain accurate measurement of power by evaluating the acceleration values obtained, the acceleration values are, in accordance with a preferred embodiment of the invention, recalculated with respect to standard conditions and the thus corrected values are then indicated. Re-calculation to standard conditions requires consideration of ambient air pressure due to altitude of the test stand, and then obtaining weather conditions, as well as ambient temperature conditions. Ambient air pressure conditions are measured by a barometer diaphragm chamber 57, associated with a mechanical-electrical transducer 58 and providing an electrical output signal to the correction unit 23 for transmission to the multiplication stage 22 as a component, at least, of the correction signal. A negative temperature coefficient (NTC) or a positive temperature coefficient (PTC) resistor 59, and forming a temperature sensor, is provided, likewise connected to correction unit 23 in order to additionally influence the value of the correction signal introduced by the correction unit 23. The correction signal, and hence its value can, in accordance with another feature of the invention which is preferably provided in the test stand, be modified in dependence on the nature of the transmission of the vehicle being tested. Vehicles having automatic transmissions have higher losses. The change in the correction value being introduced can, for example, be effected by a transfer switch 60 introducing a voltage through a resistor, shown schematically, to the correction signal unit 23.

As discussed above in connection with theoretical considerations for testing of vehicles, the correction values should have different amounts for testing during the acceleration phase and during the deceleration phase. Thus, the correction unit 23 must have an arrangement to transfer the correction value from one amount to another in dependence on the test phase, that is, whether the testing is carried out during acceleration or during deceleration. The differentiator 21 can, for example, provide a suitable output signal, the polarity of which is tested in order to effect such transfer automatically. The signal derived therefrom is schematically indicated at line 21'. Other elements may also be used.

The output of multiplier 22 thus will be a signal representative of power being measured at any given time and corrected by a correcting factor. This signal is available at terminal 122 and, for example, can be used in certain test installations for continuous read-out, for example on an oscilloscope. The two signals which arise during the two phases of testing, that is, upon acceleration and deceleration, are added. These signals are, preferably, related to a certain specific speed. The signals are stored in respective memories 24, 25, in their simplest forms capacitors, and to store them at a specific speed, that is, to allocate the signals to specific speeds of the wheels, switches 26, 27 are, respectively, provided. An inverter 28 is inserted between the output of multiplier 22 and memory 25 to invert the electrical signal measured during deceleration, that is, the signal which measures drive train losses. The two stored values in the memories 24, 25 are applied to an adder 29. The output signal of the adder is connected over a transfer switch 30 to an analog-digital (A/D) converter 31 and then to an indicator 32.

Measurement of power and storage of the measured values is effected at predetermined speeds of rollers. Speed selector switch 33 which, in effect, is a speed command signal switch, determines this speed. The speed values to be set by speed selector switch 33 would, usually, depend on the nominal characteristics of the vehicle and its engine, as determined by the manufacturer; but it may also have other speed settings, for example for comparison testing of vehicles under different conditions. The speed signal is available at terminal 133.

In many instances it may be desirable to determine speed not only with respect to a predetermined speed of rollers on which the driven wheels of the vehicle are supported but, rather, to predetermine a certain speed of the IC engine and, when that speed is reached, to then trigger further automatic programming of the test.

Thus, when these rollers have reached an appropriate speed which corresponds to the engine speed or vehicle speed, then the roller speed itself is stored. This is particularly appropriate if the manufacturer of the vehicle has indicated a nominal speed of the IC engine as a parameter for rated power. In the example given, the speed of the rollers, thus speed corresponding to vehicle speed is sensed; speed corresponding to a certain engine speed can readily be calculated from known transmission ratios, wheel diameters, and the like. Vehicles equipped with engine tachometers can be used to calibrate roller speed with respect to engine speed.

Commanded speed and actual roller speed which, for example, is derived from behind the averaging circuit 16, are compared in a first operational amplifier 34 connected as a comparator. Upon equality of commanded and actual speed, the output signal of operational amplifier 34 changes, for example, from a binary 0 to a binary 1. The positive flank of the change in output signal is used to set a bistable flip-flop (FF) 35 which opens switch 26 and thereby stores the last or highest value, attained at that speed, in memory 24. Memory 24 will thus store a signal having a value corresponding to power at a predetermined speed during the acceleration phase. The inertia mass is then accelerated slightly more to a slightly higher speed; at that slightly higher speed, indicator lamp 37 will light, indicating to the test operator that the drive connection of the drive train between the IC engine and the wheels of the vehicle is to be severed. One must note that vehicles with automatic transmissions require a somewhat higher differential speed above the commanded speed; this higher speed must be sufficiently above the speed at which storage is to be effected since automatic transmissions require longer time for complete disconnection of the automatic transmission than vehicles having clutch-controlled transmissions. Suitably, the increased speed should be selected in dependence on the type of transmission with which the vehicle is equipped. The lamp 37 which provides the output signal to sever the drive connection is energized over a bistable FF 38 which is set by the output signal from operational amplifier 36 operating as a comparator. The operational amplifier 36 will have a higher comparison level than that of operational amplifier 34. When FF 38 is energized, lamp 37 lights. The speed signal which is used to trigger FF 38 is derived from the speed selector switch 33; the command signal derived from selector switch 33 is reduced, for example, by about 10% (for a clutch-type transmission) by means of the voltage divider formed by resistors 39, 40 to be then applied to the inverting input of operational amplifier 36 operating as a comparator. The output signal of the operational amplifier 36 thus provides a SET signal to FF 38 which simulates a higher command speed than that actually commanded by switch 33. The actual speed for FF 36 is derived, as for operational amplifier 34, from the output of averaging circuit 16. An amplifier 41 is preferably included between the output circuit of FF 38 and lamp 37.

After severing the drive connection between the engine and the wheels, the inertia mass drives the wheels of the vehicle. The inertia mass slowly decelerates in this phase of operation due to losses, such as friction, windage and the like, and that speed will be reached which is commanded by means of the speed selector switch 33. At that speed, the output signal of comparator 34 switches back from the 1-state to the 0-state, thereby setting the bistable FF 42 and resetting bistable FF 38. Indicator lamp 37 will extinguish. The second bistable FF 42 opens the second switch 27 and the value which at that time is derived from the multiplier 22 is stored in the second memory 25. The adder 29 can now add the two values stored in memories 24 and 25 and provide the resulting indication of the addition at the indicator 32. The second FF 42 is controlled over a NOR-gate 43 to ensure that the second memory 25 stores the storage value only if the memory 24 has already stored a value derived from the multiplier during the first phase of testing.

Memories 24, 25, in their simplest form, are merely capacitors. It is thus not possible to hold the values stored therein for an indefinite period of time and also indicate the sum of the stored values for an appreciable period of time. To prevent erroneous indications, a timing circuit is provided formed as a monostable multivibrator (MMV) 44 which, for example, half a minute after indication of the output at indicator 32, resets all the bistable FF's 35, 42, 38 into their RESET state. Preferably, a pulse amplifier 45 is interposed between the MMV 44 which applies its output signal, upon triggering by the MMV 44, to the respective FF's 35, 42, 38. To additionally ensure that these FF's 35, 38, 42 always are in the RESET state upon starting of a test cycle, and when the rollers of the test stand and hence the inertia mass is in the accelerating phase, a voltage divider 46, 47 is provided connected to a comparator 48 which senses a low-speed condition, that is, a condition of speed well below that selected by speed selector switch 33. The comparator 48 provides an output signal, for example corresponding to a speed of $km/h$ of the vehicle, when direct transmission is engaged, to provide a reset command pulse to the pulse amplifier 45 which, in turn, provides its output to reset the respective FF's 35, 42, 38, thus ensuring that the FF's 35, 42, 38 are in RESET state. An additional interlock can be provided by connecting the pulse amplifier 45 to the initial turn-on connection network, shown merely as a block 49 (and including the various switches and circuits to connect the test stand as a whole), circuit 49 providing an output signal to pulse amplifier 45 which, again, provides the RESET pulse to the FF's 35, 38, 42.

A single memory may be used instead of the two memories 24, 25. Such a single memory is then connected to store as a first stored value the result upon acceleration and then, later, upon deceleration, store the second measuring value. The memory can readily be connected inherently as an adder so that the memory will in one step store the sum or, if an inverter is interposed, the difference between the two measured quantities. Using a single memory unit has the advantage that tolerances in the elements used in the circuit will not variably affect the output results. If, for example, the memory circuit further includes a more complicated construction, for example also an operational amplifier, extraneous influences such as drift or changes in the offset voltage will not affect the measuring result. Such memories can readily be connected in a way that errors arising in sequential measurements are self-compensating, as well known in the data processing art.

A switch 56 is connected to an interlock circuit 50 which controls an interlock transistor 51 connected to a magnetic valve 52. Valve 52 controls admission of a pressurized fluid, for example hydraulic fluid, which controls the position of the drive ramp for the test stand. Properly placing the drive ramp to permit a vehicle to drive on the test stand and to leave the test stand is necessary. After the vehicle is on the test stand, the drive ramp is locked in position to properly place the vehicle during testing. Comparator 48, as above discussed, provides an output signal when the rollers of the test stand have reached a speed corresponding, for example, to about 4 km/h of the vehicle. This output signal is also applied to the interlock circuit 50 and after this signal has been sensed, interlock circuit 50 disables further application of signals from switch 56 so that, when the vehicle wheels have reached a speed in excess of 4 km/h, no further change in the ramp position of the test stand is possible. The test stand is preferably so constructed that change-over of indication between wheel speed and engine speed is possible. A transfer switch 53 permits change-over between roller speed, as derived from the output of averaging circuit 16, and a circuit coupled to the ignition of the internal combustion engine. An ignition sensor 55, for example an inductive or capacitive coupler coupled to the ignition system of the engine of the vehicle, provides output pulses in synchronism with ignition events to a speed or RPM signal circuit 54 which, in turn, provides output signals to switch 53 similar to those derived from circuit 16, but representative of engine speed rather than speed of the rollers of the test stand.

The system is simple and reliable and permits measurement of power and delivered energy and tractive effort while considering correction parameters which depend not only on ambient test conditions and placement of the test stand, but additionally can consider conditions or constructional features of the engine or of the vehicle. Test stands so equipped can, therefore, provide accurate measurement of the power of vehicles and of their engines.

The system has been described in connection with analog circuitry. Digital circuitry may also be used, the conversion of the analog signals derived, for example, from the averaging circuit 16 and the further processing thereof to digital signals being well known. The memories 24, 25 are then preferably constructed as a single adder-memory which stores and simultaneously adds values introduced at a given time, for example, in the form of a digital shift register. Suitable buffers and reset circuits will then be provided, as well known.

Various other changes and modifications may be made within the scope of the inventive concept.

We claim:

1. Test stand system for the dynamic measurement of performance of automotive vehicles and the engines thereof using a roll test stand comprising
    rollers with which at least a driven wheel of the vehicle is in engagement;
    an inertia flywheel connected to at least one of the rollers for acceleration by the engine of the vehicle via the wheels of the vehicle through the drive train of the vehicle and for deceleration upon interruption of driving connection from the engine of the wheels;
    means sensing an operating parameter related to speed, and change of speed, and providing a speed signal;
    means sensing tractive effort supplied by the wheels upon acceleration and traction losses upon deceleration, and providing a torque signal;
    combining means responsive to the output of said traction sensing means and said speed-related sensing means to deliver a combined output representative of engine performance;
    and wherein the invention comprises
    a differentiator (21) connected to the speed-related sensing means (14, 15, 16; 18, 19, 20; 17) and forming said traction sensing means to provide said torque signal;
    a multiplier (22) having the output of the differentiator (21) and said speed sensing means applied thereto to form the product of the traction-related signal and the speed-related signal;
    and a correction network (23) providing a correction signal as commanded in said correction network and representative of correction factors connected to the multiplier (22) to introduce additional correction factors thereto to be multiplied with the speed-related and traction-related signals.

2. System according to claim 1, wherein the correction network provides two primary correction factors, one of said correction factors being applied to the multiplier during the acceleration phase of performance testing and upon acceleration of the inertia flywheel, and a different, second primary correction factor being applied during the deceleration phase of testing;
    and wherein means (16, 20) are provided to sense, respectively, increase or decrease of speed and controlling change-over of the output applied by the correction network (23) to the multiplier (22) of the respective primary correction factor being applied thereto.

3. System according to claim 1, further comprising a speed selector switch (33) providing a commanded speed output signal to effect measurement at a given command speed;
    a speed sensor (34) forming a comparator connected to the speed selector switch (33) and having said command speed output signal applied thereto and further connected to the speed-related signal to have the actual speed of the roller applied thereto, the comparator (34) providing a test speed signal when the actual speed and the commanded speed are the same;
    an acceleration memory means (24) connected to the multiplier (22) to store the output from the multiplier, the acceleration memory means (24) being controlled by said comparator (34) to store the value derived from the multiplier (22) at said test speed signal; and
    a deceleration memory (25) controlled by said test speed signal to store the value derived from the multiplier at said commanded speed and representative of losses in the vehicle.

4. System according to claim 3, further comprising output means (133) connected to the speed selector switch and applying the command speed signal to the test rollers to control the speed thereof.

5. System according to claim 3, in combination with an internal combustion engine having a speed control circuit;
    and further comprising an output circuit (133) connected to the speed selector switch (33) and to the speed control circuit of the engine to control the engine to assume a commanded speed as commanded by the speed selector switch.

6. System according to claim 1, further comprising at least one correction parameter sensor (57, 58; 59; 60) representative of at least one of: ambient pressure, and providing a pressure signal;
    temperature, and providing a temperature signal;

vehicle equipped with automatic transmission and providing an automatic transmission output signal;

said at least one sensor providing the respective correction signal to the correction network (23) to control the correction factor applied thereby to the multiplier (22).

7. System according to claim 6, wherein the sensor comprises a temperature sensor (59) providing a temperature signal to the correction network (23) and changing the correction factor applied by the correction network in accordance with changes in ambient temperature.

8. System according to claim 6, further comprising an automatic transmission correction signal generator, and a switch (60) to apply the signal from the signal generator, selectively, to the correction network (23) upon closing of the switch (60) to introduce a correction factor to the multiplier (22) through the correction network (23) if the vehicle being tested is equipped with an automatic transmission.

9. System according to claim 1, further comprising means (33, 34) generating a test speed signal;

an acceleration memory means (24) connected to the multiplier (22) to store the output from the multiplier, the acceleration memory means (24) storing the value derived from the multiplier (22) at said test speed signal; and a deceleration memory (25) controlled by said test speed signal to store the value derived from the multiplier at said commanded test speed and representative of losses in the vehicle.

10. System according to claim 9, wherein the acceleration memory means (24) and the deceleration memory means (25) comprises a storage memory energized when the test speed is reached in an acceleration phase and storing the respective value from the multiplier at that speed, and again energized during the deceleration phase of testing and storing the output from the multiplier (22) again at said speed, the memory forming a respective sum or difference value of the respectively sequentially stored quantities.

11. System according to claim 9, further comprising indicator means (32) connected to the output of the respective memory means and indicating, respectively, the sum or difference of the stored value thereof.

12. System according to claim 11, further comprising engine speed sensing means (54, 55) and switch-over means (53) connected to the indicating means (31, 32) and selectively controlling operation of the indicator with respect to engine speed, or wheel speed derived from the speed-related sensing means (13, 15, 16; 18, 19, 20; 17).

13. System according to claim 9, further comprising bistable control circuits (35, 42) controlled by the test speed signal;

controlled switches (26, 27) connected between the multiplier (22) and the respective memory means (24, 25), the controlled switches being controlled by the output of the bistable control circuits to open and close when the test speed signal is reached, first, in an accelerating direction, one controlled switch (26) storing the value from the multiplier in the acceleration memory means (24) at said commanded test speed and then, upon deceleration, the other controlled switch (27) storing the value from the multiplier in the deceleration memory means (25), the controlled switches (26, 27) being normally closed and opening when the commanded test speed is reached in respective accelerating or decelerating direction, as controlled by the respective bistable control circuit (35, 42).

14. System according to claim 9, wherein the memory means (24, 25) comprises capacitors;

and a timing circuit (44) is provided connected to and controlled by the test speed signal and resetting the memory means (24, 25) to a predetermined datum level after the test speed signal has been sensed to prevent erroneous indication by spurious discharge of the capacitors.

15. System according to claim 9, further comprising interlock circuits (50; 46, 47, 48) resetting the memory means to a predetermined datum level upon first placing the system in operation.

16. Test stand system for the dynamic measurement of performance of automotive vehicles and the engines thereof using a roll test stand comprising rollers with which at least a driven wheel of the vehicle is in engagement;

an inertia flywheel connected to at least one of the rollers for acceleration by the engine of the vehicle via the wheels of the vehicle through the drive train of the vehicle and for deceleration upon interruption of driving connection from the engine of the wheels;

means sensing an operating parameter related to speed, and change of speed, and providing a speed signal;

means sensing tractive effort supplied by the wheels upon acceleration and traction losses upon deceleration, and providing a torque signal;

combining means (22) responsive to the output of said traction sensing means and said speed-related sensing means to deliver a combined output signal representative of engine performance;

a correction network (23) providing a correction signal as commanded in said correction network and representative of correction factors connected to the combining means (22) to introduce additional correction factors thereto to be multiplied with the speed-related and traction-related signals;

means generating a test speed signal;

an acceleration memory means (24) and a deceleration memory means (25) comprising a storage memory connected to store the combined output signal and controlled by said test speed signal to store the combined output signal (a) when the test speed is reached in an acceleration phase and, to store again (b) the combined output signal when the test speed is reached during a deceleration phase, the memory forming a respective sum or difference value of the respectively stored quantities at said test speed, as controlled by the test speed signal;

and indicator means (32) connected to the output of said storage memory and indicating the sum or difference of the stored value thereof.

17. Method of dynamically testing the performance of automotive vehicles and of the engines thereof using a test stand system having rollers with which the driven wheels of the vehicle are in engagement; inertia flywheel means connected to at least one of the rollers for acceleration by the engine of the vehicle via the wheels of the vehicle through the drive train of the vehicle, and for subsequent deceleration upon interruption of driving connection between the engine and the vehicle wheels;

means (14, 15, 16; 18, 19, 20; 17) sensing an operating parameter related to speed and change thereof and providing a measured speed-related signal;

means (17; 21) sensing traction effort supplied by the wheels upon acceleration, and traction losses upon deceleration and providing a measured torque-related signal;

and combining means responsive to the measured speed-related signal and to the measured torque-related signal and deriving a combined output signal representative of engine performance, and including the steps of: connecting the drive train of the engine and accelerating the engine while sensing and measuring the speed-related signal and the traction-related signal;

storing a combined first output signal derived during acceleration from said measured signals at a first predetermined engine speed;

then disconnecting the engine to provide for deceleration and driving of the wheels of the vehicle by the inertia flywheel while sensing and measuring the speed-related signal and the torque-related signal;

storing a combined second output signal derived during deceleration from said measured signals at said first predetermined engine speed;

summing the combined first and second output signals to determine performance and power output of the engine by generating a signal representative of losses dependent upon at least one of: traction losses; speed-related losses; constant losses.

18. Method according to claim 17, wherein the testing steps for a test cycle are carried out in two phases, one phase forming an acceleration phase and comprising accelerating the engine to a second predetermined speed in excess of said first predetermined engine speed, and the other phase forming a deceleration phase and comprising removing engine power and effecting the measuring steps during deceleration;

and wherein the step of generating the first output signal comprises generating a first primary output signal at said first predetermined speed during the acceleration phase and a second primary output signal at said first predetermined speed during the deceleration phase;

and said method further including the step of changing-over from the first primary signal to the second primary signal upon change in test phase during a test cycle.

19. Method according to claim 17, further comprising the step of generating a correction signal in dependence on the type of vehicle being tested and modifying said output signals therewith.

20. Method according to claim 17, including the step of modifying the output signals in dependence on the type and rated power of the engine in the vehicle being tested.

21. Method according to claim 19, including the step of generating a standard correction signal based on predetermined ambient parameters including at least one of: ambient pressure; ambient temperature;

the step of generating generating an actual condition signal based on predetermined ambient parameters including at least one of: a pressure correction signal; a temperature correction signal;

modifying the standard correction signal by the actual condition signal;

and modifying the output signals in dependence on said modified standard correction signal.

22. Method according to claim 17, wherein the step of generating a modifying signal representative of losses in automatic vehicle transmissions;

and, selectively, modifying the output signals in dependence on said modifying signal as a if the vehicle is equipped with an automatic transmission.

* * * * *

UNITED STATES PATENT AND TRADEMARK OFFICE
CERTIFICATE OF CORRECTION

PATENT NO. : 4,055,996
DATED : November 1, 1977
INVENTOR(S) : Walter DINKELACKER et al It is certified that error appears in the above-identified patent and that said Letters Patent are hereby corrected as shown below:

Column 14, line 21, should read -- claim 17 -- not "claim 19"

line 25, the word "generating" is written twice.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks